United States Patent

Jarger

[15] 3,657,661

[45] Apr. 18, 1972

[54] FM DEMODULATOR SYSTEM

[72] Inventor: Harold F. Jarger, Rochelle Park, N.J.

[73] Assignee: International Telephone and Telegraph Corporation, Nutley, N.J.

[22] Filed: June 16, 1970

[21] Appl. No.: 46,707

[52] U.S. Cl. ..............................329/122, 325/346, 325/419, 329/50, 331/23

[51] Int. Cl. ..........................................................H03d 3/00

[58] Field of Search ................329/122, 50, 126; 331/18, 23, 331/25; 178/5.45 D, 69.5 CB; 325/419, 346

[56] References Cited

UNITED STATES PATENTS

| | | | |
|---|---|---|---|
| 3,117,280 | 1/1964 | Palmer | 325/419 X |
| 3,358,240 | 12/1967 | McKay | 325/419 X |
| 3,346,814 | 10/1967 | Haggai | 329/122 |
| 3,212,023 | 10/1965 | Broadhead | 331/25 X |
| 3,297,953 | 1/1967 | Colton | 331/25 X |

*Primary Examiner*—Alfred L. Brody

*Attorney*—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

[57] ABSTRACT

An improved threshold performance for an FM demodulator is obtained by employing the combined features of a phase locked loop demodulator and a N-path (digital) filter. The bandwidth of the filter is adjusted to approximately two times the highest baseband frequency and its center frequency is determined by the switching frequency employed in the filter which is derived from the output signal of the phase locked loop's voltage control oscillator (VCO). The VCO output signal is determined by the instantaneous IF input frequency resulting in an IF filter having a minimum bandwidth that tracks the input IF frequency.

10 Claims, 2 Drawing Figures

INVENTOR
HAROLD F. JARGER
BY
Alfred C. Hill
AGENT

FM DEMODULATOR SYSTEM

BACKGROUND OF THE INVENTION

This invention relates to frequency modulation (FM) detectors and more particularly to an FM detector having improved threshold performance.

In the present state of the communication art there is an ever present search for means and methods of obtaining high quality, reliability performance. To this end wide band angular modulation communication systems, such as FM communication systems, are being employed, since these systems have an inherently high reliability due to their immunity to noise. As is well known, an angular modulation receiver is characterized by a threshold point, above which the signal-to-noise ratio of the demodulator intelligence increases linearly with the received signal level. Below this threshold point there is a very rapid deterioration of the signal-to-noise ratio as the received signal level falls. This threshold level, therefore, determines the point at which the angular modulation communication system fails. As is known, it is a characteristic of angular modulation system that bandwidth can be traded for signal-to-noise ratio, that is, an increase in signal-to-noise ratio requires an increase in bandwidth. This generally results in an increase in the threshold point. To prevent this increase in the threshold point, it is necessary to increase the carrier power. In any communication system where the received signal may drop below the threshold point, such as in over the horizon communication systems and satellite communication system, system reliability, that is, the maintaining of the received signal above the threshold point for a given percent of timing was originally obtained by increased transmitter power, increased antenna diameter and/or diversity receiving systems. Recently, more economical arrangements are being employed to improve the receiver of angular modulation communication systems. These arrangements operate to lower the threshold point of the angular modulation receiver, that is, provide threshold extension. This will enhance the reliability, since the receiver can respond to a signal which has a poorer signal-to-noise ratio than heretofore. Also for a given reliability specification, the same arrangements will enable a reduction in the transmitter power requirement.

In general, threshold extension is obtained by reducing the effective bandwidth of the angular modulation receiver, or in other words, reduction of the modulation index of the signal, after the radio frequency amplifier in the intermediate frequency (IF) section of the receiver. This reduction of effective bandwidth reduces the receiver noise and, hence, improves the signal-to-noise ratio of the received carrier in the IF pass band. Therefore, since the threshold point depends on the signal-to-noise ratio of the receiver carrier in the IF section of the receiver, reduction of noise at that point will lower the threshold point. Thus, with the lower threshold point, the receiver will respond to signals having a lower signal-to-noise ratio than heretofore.

One of many arrangements to provide the above-mentioned threshold extension incorporates a phase locked loop technique whereby a product detector is employed for demodulation. The IF signal and the output of a voltage controlled oscillator matched in frequency to the IF signal are multiplied by the product detector for producing the demodulated signal at the output. In this system, a portion of the demodulated signal is fed back through a low pass filter as a control signal for purposes of controlling the frequency of the voltage controlled oscillator so that the frequency of this oscillator will follow the IF frequency. The combination of the oscillator frequency following the IF frequency and the low pass filter results in threshold extension, since a reduction of the effective bandwidth is achieved and the low pass frequency removes noise present in the demodulated signal.

SUMMARY OF THE INVENTION

It is an object of the present invention to provide an FM demodulator system employing a phase locked loop technique having an improved threshold performance relative to that heretofore obtainable.

Another object of the present invention is to provide an FM demodulator system having improved threshold performance by combining the techniques of a phase locked loop and a N-path (digital) filter.

A feature of the present invention is the provision of a frequency modulation demodulation system having an improved threshold comprising a source of frequency modulated signal to be demodulated; a phase locked loop demodulator means including a voltage controlled oscillator means; a N-path filter means coupled between the source and the demodulator means and to the output of the oscillator means, where N is an integer equal to or greater than three; and baseband signal output means for the demodulator system coupled to the demodulator means.

BRIEF DESCRIPTION OF THE DRAWING

The above-mentioned and other features and objects of this invention will become more apparent by reference to the following description taken in conjunction with the accompanying drawings, in which.

DESCRIPTION OF THE PREFERRED EMBODIMENT

Figure 1:
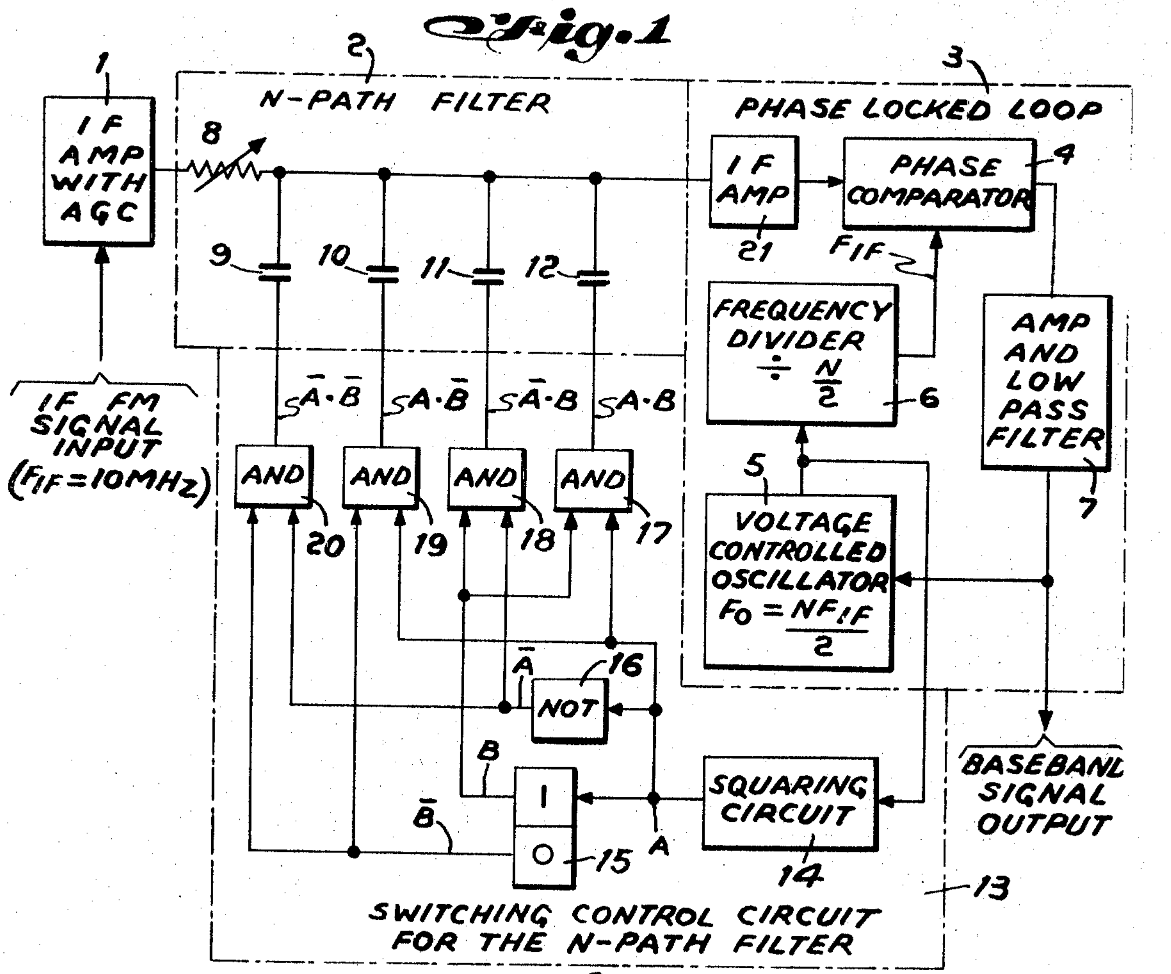
FIG. 1 is a block diagram of a frequency modulation demodulation system in accordance with the principles of the present invention.

Referring to Fig. 1, there is disclosed therein an FM demodulator system in accordance with the principles of the present invention including an FM signal in the IF frequency range applied to IF amplifier 1 having automatic gain control (AGC). The output of amplifier 1 is coupled to N-path filter 2 and, hence, to phase locked loop 3 with the baseband modulating signal of the input IF FM signal being removed from phase locked loop 3 for utilization in the remainder of the receiver equipment, such as, the equipment for recovering and utilizing the intelligence of the modulating baseband signal.

Phase locked loop 3 includes phase comparator 4 coupled to the output of filter 2 through IF amplifier 21 and to the output of voltage controlled oscillator 5. The output signal of oscillator 5 has been divided down by frequency divider 6 to an IF frequency matched to the frequency of the IF signal coupled to amplifier 1. As illustrated, oscillator 5 has an output oscillator signal equal to $NF_{IF}/2$, where $F_{IF}$ is the IF frequency of the input FM signal applied to amplifier 1 and for purposes of illustration is 10 megahertz (MHz). Thus, the output signal of oscillator 5 for the embodiment illustrated, where N is equal to four, has a frequency of 20 MHz. Divider 6 divides this oscillator output signal by two thereby providing a frequency coupled to comparator 4 equal to 10 MHz. The output of comparator 4 is the demodulated baseband and is applied through amplifier and low pass filter 7 which operates to remove noise from this baseband signal to provide a control signal for oscillator 5 thereby causing the frequency of the oscillator output signal to follow the frequency of the input IF signal. As illustrated, the baseband signal output is coupled from the output of filter 7, but it should be remembered that the baseband signal is also present at the output of oscillator 5 and, therefore, by utilizing a further demodulation the baseband signal can be derived from the output of oscillator 5.

N-path filter 2 includes four (where N equals four) inductorless low pass filters including resistor 8 and capacitors 9–12 which are coupled sequentially into the circuit path between resistor 8 and comparator 4 on a time division multiplex basis. The switching of the capacitors into the circuit being at a rate equal to and following the frequency of the input IF FM signal. The value of the four low pass filter components are identical and serve to establish the bandwidth of filter 2 which is adjusted to be approximately twice the highest frequency carried by the FM signal input. The switching frequency of the four low pass filters, which is at a rate equal to and following the frequency of the FM input signal, establishes the center frequency of a band pass filter where the switching rate of the four capacitors cause a low pass to band pass transformation.

It should be noted that while Fig. 1 illustrates the circuit for filter 2 where N equals four, filter 2 can contain N low pass filters where N is equal to three or more, with the illustrated arrangement where N is equal to four being the most practical. The limitation on the value of N is imposed because for lower values of N the desired low pass to band pass transformation is not accomplished.

Figure 2:
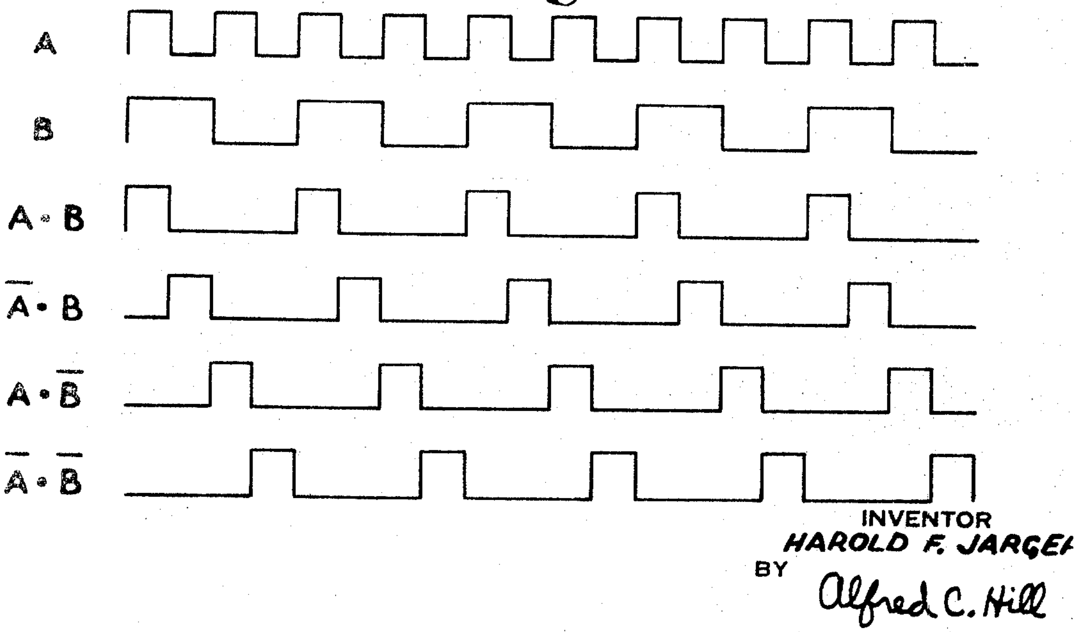
FIG. 2 illustrates timing signals appearing at the labelled locations in Fig. 1 useful in explaining the control of the N-path filter by the switching control circuit of Fig. 1.

In accordance with the principles of this invention, the switching rate at which capacitors 9–12 are coupled into the circuit is derived from oscillator 5 and must be equal to and follow the frequency variation of the input FM signal. One embodiment of deriving the switching control signals for capacitors 9–12 is illustrated in Fig. 1. As illustrated switching control circuit 13 includes a squaring circuit 14 which is coupled to the output of oscillator 5 to produce square wave signals having a frequency twice the frequency of the input IF center frequency and following the frequency variation thereof caused by the modulating baseband signal. The output of squaring circuit 14 is shown in Curve A, Fig. 2. Flip flop 15 is coupled as illustrated to circuit 14 and an inverter or NOT circuit 16 is coupled to the output of circuit 14. The output signal at the "1" output of flip flop 15 is illustrated in Curve B, Fig. 2 with the complement thereof being present at the "0" output of flip flop 15. The output of NOT 16 is the complement of Curve A, Fig. 2. AND gates 17, 18, 19 and 20 are coupled to capacitors 12, 11, 10 and 9, respectively, so that the output signals from the AND's will cause the associated capacitors to be present in the filter signal path during the presence of timing signals which are generated by the illustrated inputs to the various AND's 17–20. The logical output $A \cdot B$ of AND 17 is illustrated in Curve $A \cdot B$, Fig. 2 and is obtained by the logical AND functions of signal A and signal B. The logical output from AND gate 18, $\bar{A} \cdot B$ is shown in Curve $\bar{A} \cdot B$, Fig. 2. This waveform is produced by the logical AND function of the $\bar{A}$ output of NOT 16 and the B output of flip flop 15. The logical output $A \cdot \bar{B}$ of AND 19 is shown in Curve $A \cdot \bar{B}$, Fig. 2 and is produced by the logical AND function of the A output of circuit 14 and the $\bar{B}$ output of flip flop 15. The logical output $\bar{A} \cdot \bar{B}$ of AND 20 as illustrated in Curve $\bar{A} \cdot \bar{B}$, Fig. 2 is produced by the logical AND function of the $\bar{A}$ output of NOT 16 and the $\bar{B}$ output of flip flop 15. By observing the timing waveforms produced by AND's 17–20, it will be observed that each of the capacitors 9–12 are switched into the signal path of filter 2 at a switching rate equal to and following the frequency variation of the input IF FM signal which has a cyclic frequency one-half that of Curve A, Fig. 2.

The threshold improvement of the circuit illustrated in Fig. 1 over a conventional phase locked loop demodulator is obtained by the utilization of filter 2 in the signal path prior to the phase locked loop 3, filter 2 having a center frequency determined by the output signal of oscillator 5 of phase locked loop 3 which, in turn, is determined by the instantaneous IF input frequency of the FM signal applied to amplifier 1 thereby resulting in an IF filter having a minimum bandwidth that tracks the incoming frequency and thereby causes a further reduction in the threshold point due to elimination of noise present in the receiver prior to the signal being operated upon by phase locked loop 3. This results in an overall FM demodulator system having an improved threshold performance.

While I have described above the principles of my invention in connection with specific apparatus, it is to be clearly understood that this description is made only by way of example and not as a limitation to the scope of my invention as set forth in the objects thereof and in the accompanying claims.

I claim:

1. A frequency modulation demodulator system having an improved threshold comprising:

a source of frequency modulated signal to be demodulated, said frequency modulated signal including a modulating baseband signal;

a phase locked loop demodulator means including a voltage controlled oscillator means;

a N-path filter means coupled to the output of said oscillator means, each path of said filter means being sequentially coupled between the output of said source and the input of said demodulator means under control of the signal at said output of said oscillator means, where N is an integer equal to or greater than three; and baseband signal output means for said demodulator system coupled to said demodulator means.

2. A system according to claim 1, wherein said frequency modulated signal has a given intermediate frequency center frequency varied in frequency by said baseband signal, and said oscillator means produces an oscillator out signal having a frequency equal to N/2 times said given center frequency following said frequency variation.

3. A system according to claim 2, wherein said demodulator means includes a frequency divider means coupled to said oscillator means to divide said oscillator output signal by N/2, a phase comparator means coupled to the output of said N-path filter means and the output of said divider means, and a low pass filter means coupled between said comparator means and said oscillator means.

4. A system according to claim 3, wherein said output means is coupled to the output of said low pass filter means.

5. A system according to claim 1, wherein said N-path filter means includes

N inductorless low pass filter means, and control means coupled to said N low pass filter means and said oscillator means responsive to the output signal of said oscillator means to sequentially couple said N low pass filter means between said source and said demodulator means.

6. A system according to claim 5, wherein said frequency modulated signal has a given intermediate frequency center frequency varied in frequency by said baseband signal, said output signal of said oscillator means has a frequency equal to N/2 times said given center frequency and following said frequency variation, and each of said N low pass filter means is coupled between said source and said demodulator means at a rate equal to said given center frequency, said rate following said frequency variation.

7. A system according to claim 6, wherein

N is equal to four, and said control means includes a pulse forming means coupled to said oscillator means, a bistable means coupled to said pulse forming means, an inverter means coupled to said pulse forming means, and logic circuit means coupled to said bistable means, said inverter means, said pulse forming means and each of said N low pass filter means to produce N sequential timing signals each having said given rate to control the coupling of each of said N low pass filter means between said source and said demodulator means.

8. A system according to claim 7, wherein said bistable means includes a flip flop having a "1" output and a "0" output, and said logic circuit means includes a first AND coupled to said pulse forming means and said "1" output to produce a first of said N timing signals to control the coupling of a first of said N filter means, a second AND coupled to said inverter means and said "1" output to produce a second of said N timing signals to control the coupling of a second of said N filter means, a third AND coupled to said pulse forming means and said "0" output to produce a third of said N timing signals to control the coupling of a third of said N filter means, and a fourth AND coupled to said inverter means and said "0" output to produce a fourth of said N timing signals to control the coupling of a fourth of said N filter means.

9. A system according to claim 1, wherein said demodulator means includes a frequency divider means coupled to said oscillator means to divide said output signal of said oscillator means by N/2, a phase comparator means coupled to the output of said N-path filter means and the output of said divider means, and a low pass filter means coupled between said comparator means and said oscillator means;

said N-path filter means includes

N inductorless low pass filter means, and control means coupled to said N low pass filter means and said oscillator means responsive to said output signal of said oscillator means to sequentially couple said N low pass filter means between said source and said comparator means;

said frequency modulated signal has a given intermediate frequency center frequency varied in frequency by said baseband signal;

said output signal of said oscillator means has a frequency equal to N/2 times said given center frequency and following said frequency variation; and each of said N low pass filter means is coupled between said source and said comparator means at a rate equal to said given center frequency, said rate following said frequency variation.

10. A system according to claim 9, wherein

N is equal to four; and said control means includes a pulse forming means coupled to said oscillator means, a bistable means coupled to said pulse forming means, an inverter means coupled to said pulse forming means, and logic circuit means coupled to said bistable means, said inverter means, said pulse forming means and each of said N low pass filter means to produce N sequential timing signals each having said given rate to control the coupling of each of said N low pass filter means between said source and said comparator means.

* * * * *